(12) United States Patent
Che et al.

(10) Patent No.: US 7,454,425 B2
(45) Date of Patent: Nov. 18, 2008

(54) SYSTEM AND METHOD FOR ASSEMBLING TIMING DATA IN A MULTI-LAYER SERVER ENVIRONMENT

(75) Inventors: Christopher Che, San Jose, CA (US); Sanjay Goyal, Pleasanton, CA (US); Peter Gassner, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 429 days.

(21) Appl. No.: 10/612,769

(22) Filed: Jul. 1, 2003

(65) Prior Publication Data

US 2007/0185877 A1  Aug. 9, 2007

(51) Int. Cl.
*G06F 17/30* (2006.01)
(52) U.S. Cl. .............................. 707/10; 707/5; 709/224
(58) Field of Classification Search ................. 709/224, 709/231; 395/200; 715/505; 707/500, 1, 707/10
See application file for complete search history.

(56) References Cited

U.S. PATENT DOCUMENTS

| 5,793,976 | A * | 8/1998 | Chen et al. ................... 709/224 |
| 6,625,647 | B1 * | 9/2003 | Barrick et al. ............... 709/224 |
| 2002/0161794 | A1 * | 10/2002 | Dutta et al. .................. 707/500 |
| 2003/0004796 | A1 * | 1/2003 | Struble ........................ 705/14 |
| 2004/0111394 | A1 * | 6/2004 | Fish et al. ....................... 707/3 |
| 2004/0139433 | A1 * | 7/2004 | Blythe et al. ................. 718/100 |
| 2004/0246996 | A1 * | 12/2004 | Engel ........................... 370/508 |

OTHER PUBLICATIONS

Dooly, Daniel et al., "On-Line Analysis of the TCP Acknowledge Delay Problem", Journal of ACM, vol. 48, No. 2, Mar. 2001, 243-273.*
Datta, Anindya et al., "Broadcast Protols to Support Efficient Retrieval from Database from Databases by Mobile Users", ACM Transactions on Database Systems, vol. 24, No. 1, Mar. 1999, 1-79.*

* cited by examiner

*Primary Examiner*—Jean B Fleurantin
*Assistant Examiner*—Dennis Myint
(74) *Attorney, Agent, or Firm*—Townsend and Townsend and Crew LLP (57) ABSTRACT

A system and method for assembling timing data in a multi-layer server environment are disclosed. An HTML based request is generated. A time of generation of the HTML based request is then deposited in one or more hidden data fields associated with the HTML based request. The HTML based request is forwarded to one or more servers that deposit an arrival time in the one or more hidden data fields. Next, an HTML based response is generated. The arrival times provided by the one or more servers are transferred to one or more hidden data fields associated with the HTML based response. The HTML based response is forwarded to one or more servers that deposit a departure time in the one or more hidden data fields associated with the HTML based response.

11 Claims, 3 Drawing Sheets

SYSTEM AND METHOD FOR ASSEMBLING TIMING DATA IN A MULTI-LAYER SERVER ENVIRONMENT

CROSS-REFERENCES TO RELATED APPLICATIONS

Not applicable.

BACKGROUND OF THE INVENTION

1. Field of the Invention

The present invention relates generally to the field of tracking data processing time and transmission time, and more particularly to a system and method for assembling timing data in a multi-layer server environment.

2. Background of the Invention

Communicating data via a network has become a very popular way of efficiently sending data to one or more parties. Data typically travels through some type of multi-tier environment in order to be packaged for output and/or processed following receipt of the data. As communication of the data via a network, such as a local area network (LAN), a wide area network (WAN), etc., grows in popularity, the time it takes for the data to arrive at a particular location becomes ever more important. In order to track data rates, many networks employ monitoring systems that attempt to record the time the data spends at each tier in the multi-tier environment.

In a centralized monitoring system, for instance, each tier (i.e. layer) that a HyperText Markup Language (HTML) page travels through sends a message to a central repository or server indicating the time the data arrives at that particular tier. Typically, these monitoring systems provide collective metrics, such as the total time it takes for the data to make its round trip. Thus, specific business transactions, such as the time data spends at each tier in the multi-tier system, is not generally recorded. Although collective metrics can provide information about the efficiency of the multi-tier environment, these type of metrics do not ordinarily provide information related to where a bottleneck may exist in the multi-tier environment, for instance, since timing data for each tier is not provided.

For centralized monitoring systems to work properly, a server must understand the messages being communicated to the central repository or server and must not be confused by receiving messages from multiple sources simultaneously. Since many users may be utilizing a system at the same time, the monitoring system must be able to track multiple data and record the messages from the various tiers regarding the times when the data arrives at each of the various tiers.

In addition, a centralized monitoring system typically requires synchronization. The central repository usually needs to maintain synchronization with each of the tiers that report to the central repository, else the messages cannot be interpreted properly to reveal total round trip time of the data traveling through the system.

Therefore, it can be appreciated that there exists a need for a system and method for assembling timing data in a multi-layer server environment. There exists a further need for a process for assembling this timing data efficiently, with minimum overhead.

SUMMARY OF THE INVENTION

The present invention provides in various embodiments a system and method for assembling timing data in a multi-layer server environment.

In a system according to one embodiment of the present invention, the system facilitates assembling timing data in a multi-layer environment. A browser generates an HTML based request including one or more hidden data fields. The browser also displays an HTML based response including one or more hidden data fields. An arrival time generator deposits an arrival time in the one or more hidden data fields of the HTML based request. A processing module generates the HTML based response. A departure time generator deposits a departure time in the one or more hidden data fields of the HTML based response.

In a method according to another embodiment of the present invention, the method facilitates assembling timing data in a multi-layer server environment. An HTML based request is generated. A time of generation of the HTML based request is then deposited in one or more hidden data fields associated with the HTML based request. The HTML based request is forwarded to one or more servers that deposit an arrival time in the one or more hidden data fields. Next, an HTML based response is generated. The arrival times provided by the one or more servers are transferred to one or more hidden data fields associated with the HTML based response. The HTML based response is forwarded to one or more servers that deposit a departure time in the one or more hidden data fields associated with the HTML based response.

A further understanding of the nature and advantages of the inventions herein may be realized by reference to the remaining portions of the specification and the attached drawings.

DESCRIPTION OF THE SPECIFIC EMBODIMENTS

As shown in the exemplary drawings wherein like reference numerals indicate like or corresponding elements among the figures, embodiments of a system and method according to the present invention will now be described in detail. The following description sets forth an example of a system and method for assembling timing data in a multi-layer server environment.

A system and method in accordance with an embodiment of the present invention assembles timing data in a multi-layer server environment in order to assess the efficiency of individual servers in the multi-layer server environment. An HTML page is generated as a request. The HTML page request is forwarded to various servers in the multi-layer server environment until a response HTML page is created to fulfill the request. Similarly, the HTML page response is forwarded to various servers and eventually the HTML page response is displayed to a user.

These request and response HTML pages can include hidden data fields that can store various kinds of data. Each server in the multi-layer server environment that receives the HTML request page deposits an arrival time into the hidden data fields of the HTML request page, wherein the servers in the multi-layer server environment include a central processing unit (CPU) and a computer-readable storage medium such as hard disk, CD ROM, optical disk, and the like. When an HTML response page is generated, the arrival times reported by the various servers are transferred to the hidden data fields in the HTML response page. In addition, each server that receives the HTML response page inserts departure times of the HTML response page into the hidden data fields in the HTML response page. The arrival times of the HTML request page and the departure times of the HTML response page are stored in a database server. These arrival and departure times can be utilized to calculate the efficiency of each server in the multi-layer server environment.

It should be understood that the present invention can also be implemented using any markup language or other programming language or network protocol that can generate forms and/or support hidden fields or comments fields. Extended Markup Language (XML) and Visual Basic are both examples of such other languages. Likewise, HyperText Transport Protocol (HTTP), commonly used with HTML page transmissions, can be used to implement the present invention by supporting data fields ignored by those not utilizing the present invention yet available to those who do.

Figure 1:
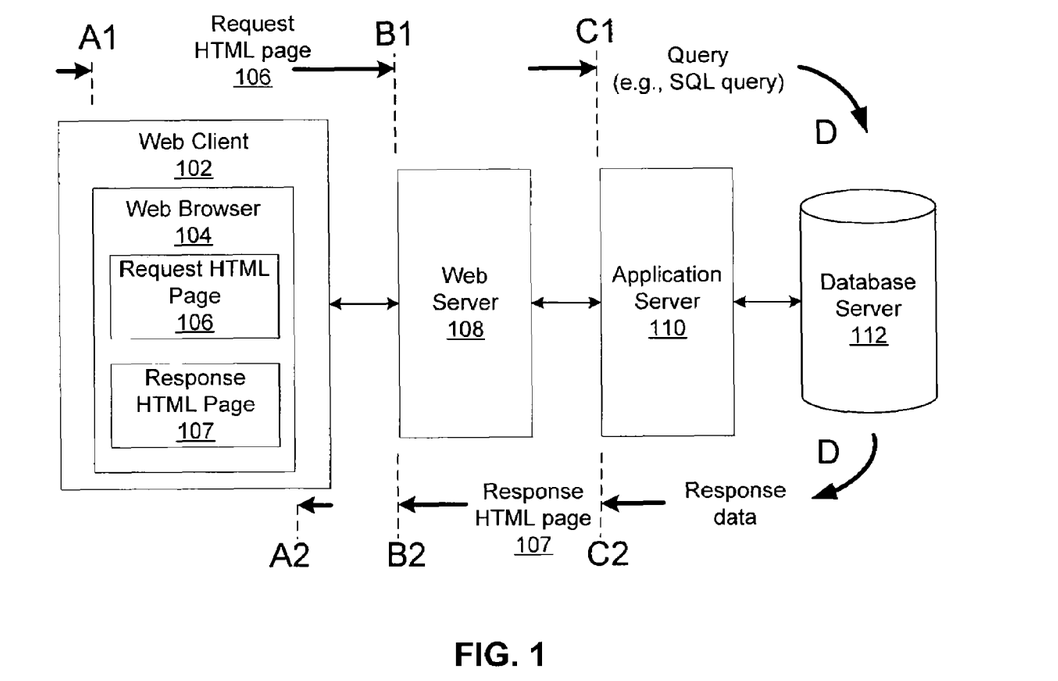
FIG. 1 is a schematic diagram of an exemplary architecture for assembling timing data in a multi-layer server environment.

Referring now to FIG. 1, a schematic diagram of an exemplary architecture for assembling timing data in a multi-layer server environment is shown. The multi-layer server environment includes a web client 102 running a web browser 104 that displays an HTML page. HTML page may be a request HTML page 106 or a response HTML page 107. A web server 108 processes request HTML page 106 as a request and forwards request HTML page 106 to an application server 110. Application server 110 retrieves response data from a database server 112. A response HTML page 107 is generated by application server 110 and forwarded back to web server 108 and displayed by web browser 104 via web client 102.

Although web browser 104 is shown as being run on web client 102 in FIG. 1, web browser 104 may be run on any machine in accordance with the invention. Further, although web browser 104, web server 108, application server 110, and database server 112 are shown as being physically separated in FIG. 1, one or more of web browser 104, web server 108, application server 110, and database server 112 may be located on a single server or fewer servers than shown in FIG. 1. In other words, any one of web browser 104, web server 108, application server 110, and database server 112 may be combined in any number of variations onto one or more servers.

FIG. 1 includes timing symbols that represent when request HTML page 106 arrives at a particular server and when response HTML page 107 departs a particular server. A1 represents the time when request HTML page 106 is generated. Request HTML page 106 includes hidden data fields for storing small amounts of data, such as timing information, a text string, etc. When request HTML page 106 is generated, the time of request HTML page 106 generation is deposited into the hidden data fields in request HTML page 106.

Next, when request HTML page 106 arrives at web server 108, web server 108 deposits into the hidden data fields of request HTML page 106 the time request HTML page 106 arrives. The time of arrival at web server 108 is represented by B1.

Web server 108 forwards request HTML page 106 to application server 110. Application server 110 deposits an arrival time into the hidden data fields in request HTML page 106. The arrival time at application server 110 is represented by the symbol C1 in FIG. 1.

Application server 110 forwards a request to database server 112 for data to fulfill the request. For example, application server 110 may send an SQL query to database server 112 requesting data to fulfill the request represented by request HTML page 106. Database server 112 can also be queried for the time utilized in order to process the request for data. Thus, the symbol D in FIG. 1 represents database time.

In an alternative embodiment, an arrival time of an SQL query, or any other type of query as is suitable with the present invention, at database server 112 may be reported to application server 110 to be deposited in the hidden data fields of request HTML page 106 and a departure time of data in response to the SQL query from database server 112 may be reported to application server 110 to be deposited in hidden data fields of a response HTML page 107 by application server 110. In this embodiment, database time is calculated by subtracting the arrival time of the SQL query at database server 112 from the departure time of the SQL query from database server 112.

Application server 110 generates response HTML page 107 to fulfill the request from request HTML page 106. Application server 110 transfers A1, the time of generation of request HTML page 106 from web browser 104, and B1 and C1, the arrival times of request HTML page 106 at web server 108 and application server 110 respectively, to response HTML page 107 that application server 110 generates. If database server 112 has reported an arrival time and departure time of the SQL query, those times are also deposited into the hidden data fields of response HTML page 107. Application server 110 then deposits into the hidden data fields of response HTML page 107 the time of departure of response HTML page 107 from application server 110 and forwards response HTML page 107 to web server 108. This departure time is represented in FIG. 1 by the symbol C2.

Web server 108 receives response HTML page 107 and delivers response HTML page 107 to web browser 104 to display response HTML page 107. Web server 108 deposits the departure time of response HTML page 107 in the hidden data fields of response HTML page 107. The departure time of response HTML page 107 is represented in FIG. 1 by the symbol B2.

Web browser 104 displays response HTML page 107. A2 in FIG. 1 represents the time response HTML page 107 is delivered to web browser 104 for display. Thus, web browser 104 deposits the time response HTML page 107 is displayed into the hidden data fields of response HTML page 107.

When another request is sent to web server 108 utilizing request HTML page 106, the request generation time at web browser 104 and arrival times at web server 108 and application server 110 for the second request are deposited in the hidden data fields of request HTML page 106. When application server 110 receives the second request via request HTML page 106, the arrival times and the departure times from the previous request utilizing request HTML page 106 and response HTML page 107 are stored in database server 112. Thus, the second request HTML page 106 includes arrival and departure times from a first round request (i.e., request and response) as well as arrival times from a second round request. When the first round times are stored in database server 112, hidden data fields in the second request HTML page 106 are freed. Accordingly, there are adequate hidden data fields in the second response HTML page 107 since the first round times are stored in database server 112 rather than transferred to the hidden data fields in second response HTML page 107. In an embodiment, timing data from a previous round is stored in database server 112 each time request HTML page 106 is processed.

The time spent at each layer in the multi-layer server environment can be calculated utilizing the deposited and/or stored arrival and departure times of request HTML page 106 and response HTML page 107. The total time it takes the HTML page to travel through the multi-layer server environment from generation of request HTML page 106 to display of response HTML page 107 can be calculated by subtracting A1 from A2. Note that although B1 and C1 represent arrival times of request HTML page 106, while C2 and B2 represent departure times of response HTML page 107, A2 represents delivery (i.e., arrival) of response HTML page 107 and A1 represents generation (i.e., departure) of request HTML page 106. In other words, A1 represents departure time rather than arrival time since request HTML page 106 is generated and departs an original location before it can arrive at one or more destinations. Similarly, A2 represents arrival time rather than departure time since response HTML page 107 arrives at a final destination for display, completing the round trip.

In order to calculate web browser 104 time, B1 is subtracted from B2 and the result is subtracted from the total time (A2-A1). For instance, if request HTML page 106 was generated by web browser 104 at 12:03:50 (i.e., time deposited in hidden data fields represented by A1) and arrived at web server 108 at 12:03:51 (i.e., time deposited in hidden data fields represented by B1) and response HTML page 107 departed web server 108 at 12:03:52 (i.e., time deposited in hidden data fields represented by B2) and was displayed by web browser 104 at 12:03:53 (i.e., time deposited in hidden data fields represented by A2), browser time equals (12:03:53−12:03:50)−(12:03:52−12:03:51), which equals two seconds. Thus, while the total time it took from generation of the request to display of the response was three seconds, two of those three seconds was utilized by web browser 104. By analyzing the timing information provided in the above example, it is clear that web browser 104 is not performing as efficiently as the other servers in the multi-layer server environment. The timing information provided by each server in the multi-layer server environment can provide insight into the efficiency of each server in the multi-layer server environment.

In order to determine web server 108 time, C1 is subtracted from C2 and the difference is then be subtracted from the difference of B2 and B1. Application server 110 time can be determined by subtracting D (i.e., database time) from the difference between C2 and C1. As discussed herein, D equals database time, which as has been explained can be determined by a simple query to database server 112 requesting the total processing time for a particular request for data to fulfill the request associated with request HTML page 106, among other approaches.

The formulas discussed herein can be utilized to determine the efficiency of each server in the multi-layer server environment. Accordingly, an analysis of this timing data can identify bottlenecks in the multi-layer server environment. Identifying any type of problem and/or performance generally utilizing the timing data in the multi-layer server environment is within the scope of the invention. Below is a chart setting forth the formulas discussed herein.

TOTAL TIME = A2 − A1
BROWSER TIME = TOTAL TIME − (B2 − B1)
WEB SERVER TIME = (B2 − B1) − (C2 − C1)
APPLICATION SERVER TIME = (C2 − C1) − D
DATABASE TIME = D

Although the above formulas are typically utilized to obtain timing information, any formula for obtaining timing information is within the scope of the invention. For instance, each layer (i.e., server) in the multi-layer server environment may deposit an arrival time and a departure time of each request HTML page 106 and response HTML page 107. In this example, web browser 104 may deposit the time HTML request page 106 is generated as well as the time HTML request page is forwarded to web server 108. Similarly, web server 108 can deposit the time HTML request page 106 arrives and the time HTML request page 106 is forwarded to application server 110, and so on. Accordingly, in order to obtain the total time spent at each layer in the multi-layer server environment, the difference in time between the arrival time and departure time for request HTML page 106 at each layer and the difference in time between the arrival time and departure time for response HTML page 107 at each layer are added together.

In this example, network latency time can also be calculated since both the arrival time and the departure time at each layer for both request HTML page 106 and response HTML page 107 are deposited into the hidden data fields discussed herein. Accordingly, by adding the times between the departure and arrival times at each server in the multi-layer server environment, the network latency can be determined. Similarly, the total time spent at each server can be subtracted from the total time for the round trip of the generation of request HTML page 106 to the display of response HTML page 107 in order to determine network latency.

In one embodiment, data other than timing data is deposited in the hidden data fields of request HTML page 106 and response HTML page 107. For instance, a text string message may be deposited in the hidden data fields wherein the text string includes information regarding CPU load, hostname, routing information, memory utilizing by the particular layer, Operating System (OS) queue-length, lining up various request types, memory use, etc. Depositing any type of data into the hidden data fields of request HTML page 106 and/or response HTML page 107 is within the scope of the invention.

In another embodiment, the data, timing or otherwise, deposited in the hidden data fields of request HTML page 106 and/or response HTML page 107 is displayed rather than hidden. Accordingly, a user may be able to view the data deposited by each server in the multi-layer server environment. As discussed herein, each server (i.e. layer) need not be a physically separate device. For instance, the server may be a software program running on a client device and/or a physical server. Further, each server may be separate from the other servers in the multi-layer server environment or one or more servers may share a physical medium.

Typically, the times deposited into the hidden data fields of request HTML page 106 and response HTML page 107 are local times of the servers depositing the particular times. Accordingly, the servers do not need to be synchronized with one another since the total time spent at each server is relative to the local time at that server. In one embodiment, however, the times of each server are synchronized.

Figure 2:
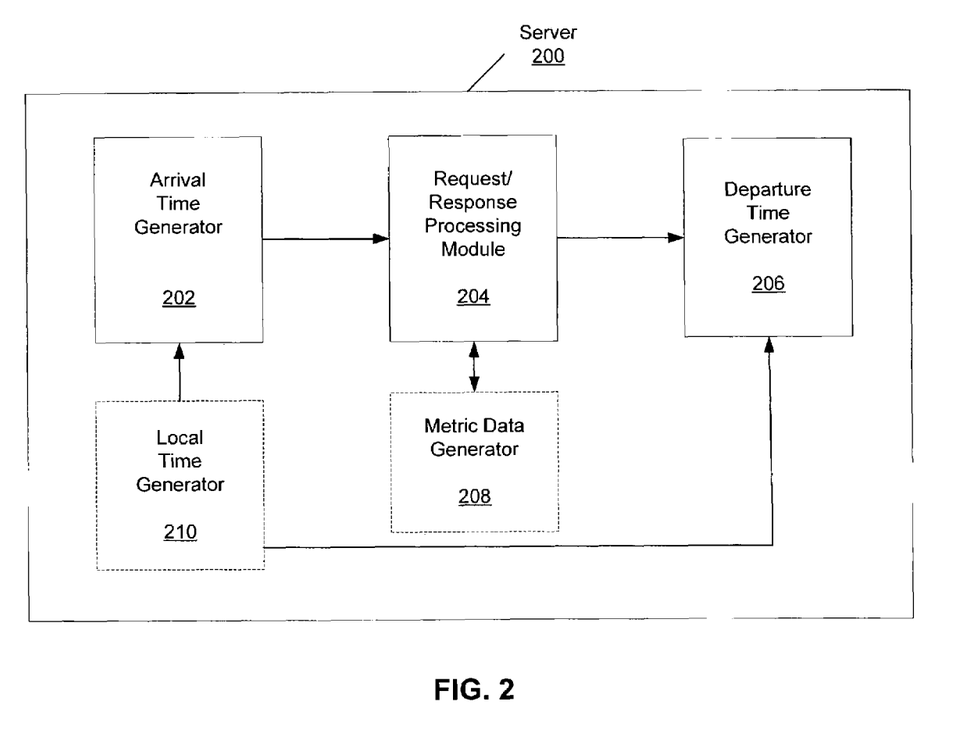
FIG. 2 is a schematic diagram of an exemplary architecture for a server in the multi-layer server environment.

Referring now to FIG. 2, a schematic diagram of an exemplary architecture for a server 200 in the multi-layer server environment is shown. The server 200 depicted in FIG. 2 may be the web server 108, the application server 110, and/or any other server as is suitable with the present invention.

A server 200 includes an arrival time generator 202, a request/response processing module 204, and a departure time generator 206. Optionally, server 200 may include a local time generator 210 that keeps track of local time and/or a metric data generator 208 that can store and/or access metric data. In one embodiment, metric data generator 208 is coupled to database server 112 in order to obtain data therefrom. Server 200 can include any components in accordance with the present invention.

Arrival time generator 202 determines a local time and deposits the local arrival time of the request in the hidden data fields of HTML page 106. In one embodiment, arrival time generator 202 is coupled to local time generator 210 where it obtains the local time to deposit into the hidden data fields of HTML page 106.

Request/response processing module 204 processes a request and/or a response HTML page 106. Processing can entail creating a response to fulfill a request, locating a request, forwarding a request and/or response to an appropriate destination, etc. In one embodiment, request/response processing module 204 may be coupled to metric data generator 208 in order to obtain metric data to deposit in the hidden data fields in a request and/or response HTML page 106.

Departure time generator 206 determines a local time and deposits the local time in the hidden data fields of HTML page 106. In one embodiment, departure time generator 206 is coupled to local time generator 210 where it obtains the local time.

Local time generator 210 is a timekeeper internal to server 200. In one embodiment, local time generator 210 is coupled to a source outside of server 200 in order to obtain a time, such as the local time. Local time generator 210 may be synchronized with one or more other servers in one embodiment.

Metric data generator 208 provides metric data to request/response processing module 204 to deposit into the hidden data fields of HTML page 106. As discussed herein, metric data generator 208 may be coupled to database server 112 for obtaining metric data in one embodiment. Metric data generator 208 may store metric data and/or obtain metric data from any source. Metric data may include CPU load, hostname, routing information, request types, memory utilized by a particular layer, operating system queue-length, memory use, etc.

Figure 3:
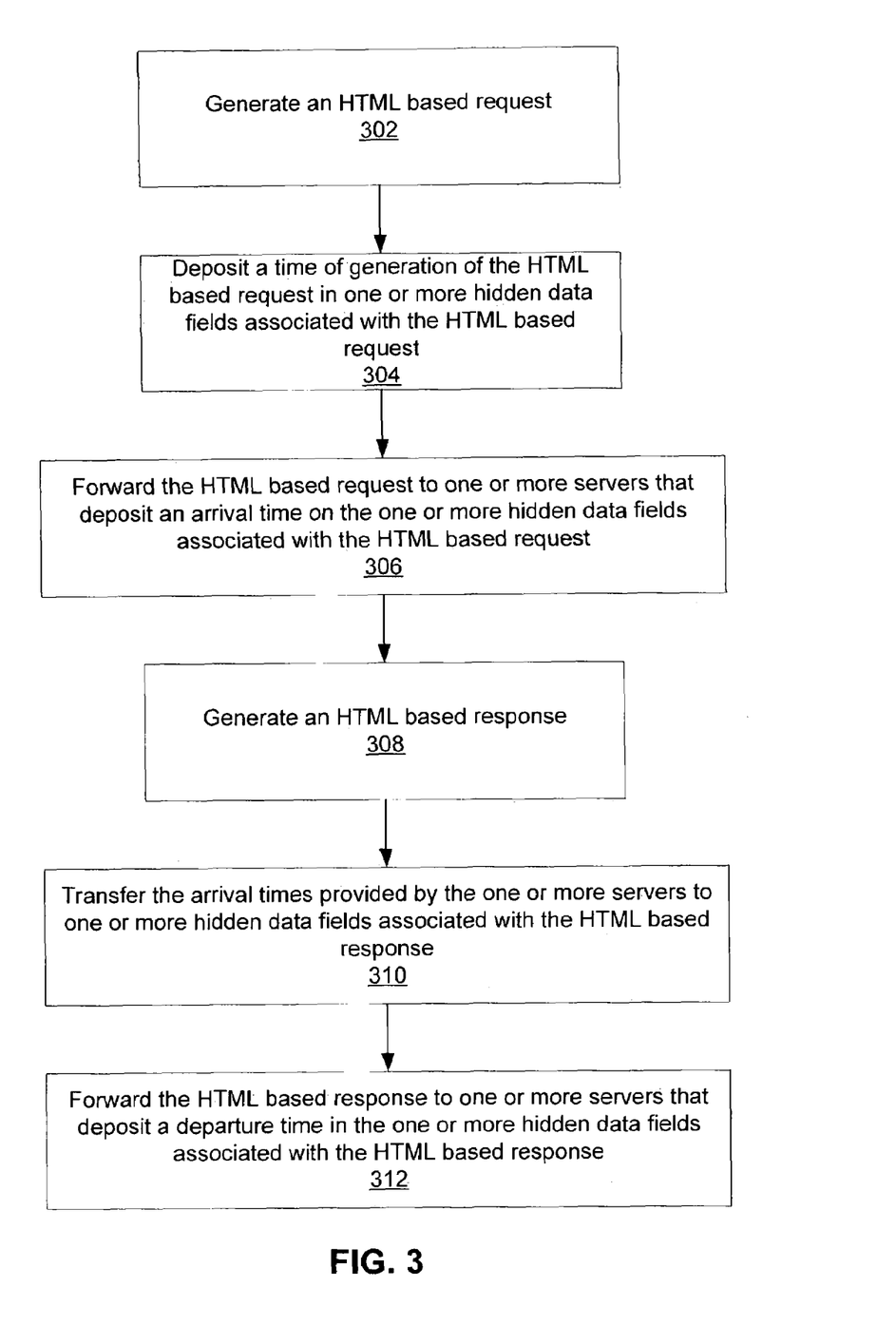
FIG. 3 is a flowchart illustrating a process for assembling timing data in a multi-layer server environment.

Referring now to FIG. 3, a flowchart illustrating a process for assembling timing data in a multi-layer server environment is shown. At step 302, an HTML based request is generated. Typically, web browser 104 generates this HTML based request.

Next, at step 304, a time of generation of the HTML based request is deposited in one or more hidden data fields associated with the HTML based request. HTML pages include hidden data fields where data can be embedded. This data is not viewable by a user generally due to being embedded in the hidden data fields. However, displaying the hidden data fields and the data embedded therein is within the scope of the invention.

At step 306, the HTML based request is forwarded to one or more servers that deposit an arrival time in the one or more hidden data fields associated with the HTML based request. As discussed herein, the HTML based request may be forwarded to web server 108 and/or application server 110, which both may deposit arrival times of HTML based request (i.e. request HTML page 106) in the hidden data fields associated with the HTML based request.

At step 308, an HTML based response is generated. As discussed herein, application server 110 typically sends a query, such as an SQL query, to database server 112 requesting data to fulfill the HTML based request. Application server 110 then generates the HTML based response utilizing the data returned by database server 112.

At step 310, the arrival times provided by the one or more servers are transferred to one or more hidden data fields associated with the HTML based response. As discussed herein, there may be more or fewer servers (i.e., layers) than web browser 104, web server 108, and application server 110. Further, each server may deposit an arrival time and a departure time of the HTML based request as well as an arrival time and a departure time of the HTML based response, in one embodiment.

At step 312, the HTML based response is forwarded to one or more servers that deposit a departure time in the one or more hidden data fields associated with the HTML based response. As discussed herein, application server 110 and web server 108 may deposit departure times of the HTML based response, while web browser 104 deposits the time it receives and displays the HTML based response.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for assembling timing data for each layer in a multi-layer server environment including a plurality of servers, comprising:

generating a first HTML based request;

depositing a time of generation of the first HTML based request in one or more hidden data fields associated with the first HTML based request;

forwarding the first HTML based request to a first set of servers of the plurality of servers, wherein each server of the first set of servers deposits in the one or more hidden data fields associated with the first HTML based request an arrival time of the first HTML based request arriving into the server and a departure time of the first HTML based request departing from the server;

generating, by a server of the first set of servers, an HTML based response in response to receiving the first HTML based request;

depositing a time of generation of the HTML based response in one or more hidden data fields associated with the HTML based response;

transferring the arrival times, the time of generation of the HTML based request, and the departure times to the one or more hidden data fields associated with the HTML based response;

forwarding the HTML based response to a second set of servers of the plurality of servers, wherein each server of the second set of servers deposits in the one or more hidden data fields associated with the HTML based response an arrival time of the HTML based response arriving into the server and a departure time of the HTML based response departing from the server;

receiving the HTML based response to a browser for displaying the HTML based response, the browser operable to store a time of arrival and a time of display for the HTML based response;

generating a second HTML based request, the second HTML based request including the times of generation of the first HTML based request and the HTML based response, the arrival times of the first HTML based request and the HTML based response, the departure times of the first HTML based request and the HTML based response, and the time of display for the HTML based response in one or more hidden data fields associated with the second HTML based request; and storing the times of generation of the first HTML based request and the HTML based response, the arrival times of the first HTML based request and the HTML based response, the departure times of the first HTML based request and the HTML based response, and the time of display for the HTML based response from the hidden data fields in the HTML based response in a database within a request-response cycle corresponding to the second HTML based request.

2. The method of claim 1, further comprising displaying the one or more hidden data fields to a user.

3. The method of claim 1, further comprising performing analysis on the times of generation, arrival times, departure times, and time of display in the database to determine a time of delay at each server and at the browser for the first HTML based request and the HTML based response, the plurality of servers including at least one of an application server and a database server.

4. The method of claim 1, wherein at least one of the arrival time of the first HTML based request arriving into the server and the departure time of the first HTML based request departing from the server is based on a local time associated with the plurality of servers.

5. The method of claim 4, wherein the local time of at least one of the plurality of servers is synchronized with at least one other of the plurality of servers.

6. A system for assembling timing data in a multi-layer server environment including a plurality of servers, each of the plurality of servers including a central processing unit (CPU) and a computer-readable storage medium, the system comprising;

a browser for generating a first HTML based request including one or more hidden data fields and for displaying an HTML based response including one or more hidden data fields;

a first server of the plurality of servers for receiving the first HTML based request, depositing into the one or more hidden data fields of the first HTML based request an arrival time of the first HTML based request arriving into the first server, and depositing into the one or more hidden data fields of the first HTML based request a departure time of the first HTML based request departing from the first server;

a second server of the plurality of servers-for receiving the first HTML based request and generating an HTML based response in response thereto, the second server operable to transfer the arrival time and departure time of the first HTML based request into the one or more hidden data fields of the HTML based response, and deposit a time of arrival of the first HTML based request and the departure time of the HTML based response into the one or more hidden data fields of the HTML based response;

a third server of the plurality of servers for receiving the HTML based response, depositing into the one or more hidden data fields an arrival time of the HTML based response arriving into the third server, and depositing into the one or more hidden data fields a departure time of the HTML based response departing from the third server;

wherein the browser is further operable to store a rime of arrival and a time of display for the HTML based response, and generate a second HTML based request including the times of generation of the first HTML based request and the HTML based response, the arrival times of the first HTML based request and the HTML based response, the departure times of the first HTML based request and the HTML based response, and the time of display for the HTML based response in one or more hidden data fields associated with the second HTML based request;

wherein-second server is operable to perform analysis on the times of generation, arrival times, departure times, and time of display to determine a time of delay at each server and at the browser for the first HTML based request and the HTML based response, the second server further including at least one of an application server and a database server; and a database for storing the times of generation of the first HTML based request and the HTML based response, the arrival times of the first HTML based request and the HTML based response, the departure times of the first HTML based request and the HTML based response, and the time of display for the HTML based response within a request-response cycle corresponding to the second HTML based request.

7. The system of claim 6, further comprising an internal clock associated with the first server for keeping local time.

8. The system of claim 6, further comprising an internal clock associated with the second server for keeping local time.

9. The system of claim 6, wherein the first server is a web server.

10. The system of claim 6, wherein the second server is an application server.

11. A computer program product stored on a computer-readable storage medium configured to store instructions operational by a processor of a computer system for assembling timing data for each layer in a multi-layer server environment including a plurality of servers, the computer program product comprising;

code for generating a first HTML based request;

code for depositing a time of generation of the first HTML based request in one or more hidden data fields associated with the first HTML based request;

code for forwarding the first HTML based request to a first set of server of the plurality of servers, wherein each server of the first set of servers deposits in the one or more hidden data fields associated with the first HTML based request an arrival time of the first HTML based request arriving into the server and a departure time of the first HTML based request departing from the server;

code for generating, by a server of the first set of servers, an HTML based response in response to receiving the first HTML based request;

code for depositing a time of generation of the HTML based response in one or more hidden data fields associated with the HTML based response;

code for transferring the arrival times, the time of generation of the HTML based request, and the departure times to the one or more hidden data fields associated with the HTML based response;

code for forwarding the HTML based response to a second set of servers of the plurality of servers, wherein each server of the second set of servers deposits in the one or more hidden data fields associated with the HTML based response an arrival time of the HTML based response arriving into the server and a departure time of the HTML based response departing from the server;

code for receiving the HTML based response to a browser for displaying the HTML based response, the browser operable to store a time of arrival and a time of display for the HTML based response;

code for generating a second HTML based request, the second HTML based request including the times of generation of the first HTML based request and the HTML based response, the arrival times of the first HTML based request and the HTML based response, the departure times of the first HTML based request and the HTML based response, and the time of display for the HTML based response in one or more hidden data fields associated with the second HTML based request; and code for storing the times of generation of the first HTML based request and the HTML based response, the arrival times of the first HTML based request and the HTML based response, the departure times of the first HTML based request and the HTML based response, and the time of display for the HTML based response from the hidden data fields in the HTML based response in a database within a request-response cycle corresponding to the second HTML based request.

* * * * *

UNITED STATES PATENT AND TRADEMARK OFFICE
CERTIFICATE OF CORRECTION

PATENT NO. : 7,454,425 B2  Page 1 of 1
APPLICATION NO. : 10/612769
DATED : November 18, 2008
INVENTOR(S) : Che et al.

It is certified that error appears in the above-identified patent and that said Letters Patent is hereby corrected as shown below:

In column 9, line 33, in Claim 6, delete ";" and insert -- : --, therefor.

In column 9, line 46, in Claim 6, delete "servers-for" and insert -- servers for --, therefor.

In column 9, line 63, in Claim 6, delete "rime" and insert -- time --, therefor.

In column 10, line 7, in Claim 6, delete "wherein-second" and insert -- wherein second --, therefor.

In column 10, line 36, in Claim 11, delete ";" and insert -- : --, therefor.

In column 10, line 43, in Claim 11, delete "server" and insert -- servers --, therefor.

Signed and Sealed this

Twenty-seventh Day of April, 2010

David J. Kappos
*Director of the United States Patent and Trademark Office*